United States Patent [19]

Chao

[11] Patent Number: 5,737,054
[45] Date of Patent: Apr. 7, 1998

[54] AUXILIARY LENSES FOR EYEGLASSES

[76] Inventor: Richard Chao, No. 43-4, Yi Hsin Tsuen, Shui San Hsiang, Chia Yi Hsien, Taiwan

[21] Appl. No.: 766,327

[22] Filed: Dec. 13, 1996

[51] Int. Cl.$^6$ ................... G02C 9/00; G02C 7/08
[52] U.S. Cl. ........................... 351/47; 351/57
[58] Field of Search ................ 351/47, 57, 41, 351/58, 106, 158; 2/441, 443

[56] References Cited

U.S. PATENT DOCUMENTS 5,416,537  5/1995  Sadler ........................... 351/57

Primary Examiner—Hung X. Dang
Attorney, Agent, or Firm—Charles E. Baxley, Esq.

[57] ABSTRACT

An eyeglass device includes a primary and an auxiliary spectacle frames for supporting lenses. The primary spectacle frame includes a magnetic connector member secured in the middle bridge portion. The auxiliary spectacle frame includes a middle bridge portion having a projection for engaging over the middle bridge portion of the primary spectacle frame and having a magnetic connector member for engaging with the connector member of the primary spectacle frame such that the spectacle frames can be easily secured together with only one hand.

4 Claims, 1 Drawing Sheet

AUXILIARY LENSES FOR EYEGLASSES

BACKGROUND OF THE INVENTION

1. Field of the Invention

The present invention relates to auxiliary lenses, and more particularly to auxiliary lenses for eyeglasses.

2. Description of the Prior Art

The closest prior art of which applicant is aware is his prior U.S. Pat. No. 5,568,207 to Chao. The spectacle frames comprise a primary spectacle frame having two magnet members provided on the upper side portions, and an auxiliary spectacle frame including a pair of arms for engaging over the upper side portions for preventing the auxiliary spectacle frame from moving downward relative to the primary spectacle frame and having two magnet members for engaging with the magnet members of the primary spectacle frame and for stably attaching the auxiliary spectacle frame to the primary spectacle frame. However, two pairs of magnet members are required such that the manufacturing cost is increased. In addition, the user have to align two pairs of magnet members.

The present invention has arisen to mitigate and/or obviate the afore-described disadvantages of the conventional spectacle frames.

SUMMARY OF THE INVENTION

The primary objective of the present invention is to provide auxiliary lenses which may be easily engaged on the primary spectacle frames.

In accordance with one aspect of the invention, there is provided an eyeglass device comprising a primary spectacle frame for supporting primary lenses therein, the primary spectacle frame including a middle bridge portion, a first magnetic or magnetizable member secured in the middle bridge portion of the primary spectacle frame, an auxiliary spectacle frame for supporting auxiliary lenses therein, the auxiliary spectacle frame including a middle bridge portion having a projection extended therefrom for extending over and for engaging with the middle bridge portion of the primary spectacle frame, and a second magnetic or magnetizable member secured to the projection of the auxiliary spectacle frame for engaging with the first connector member of the primary spectacle frame and for allowing the auxiliary spectacle frame to be attached to the primary spectacle frame with only one hand by a user.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
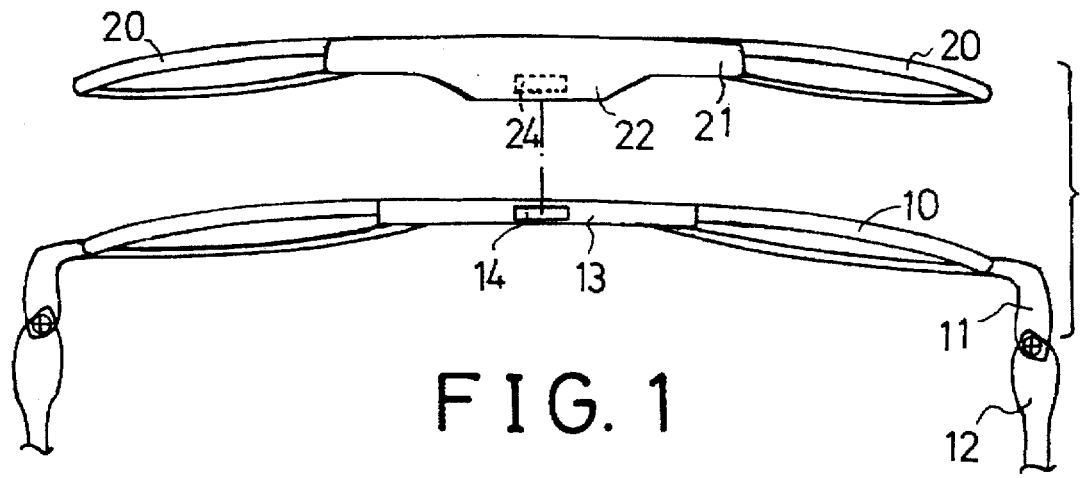
FIG. 1 is a top plan view illustrating a spectacle frame and auxiliary lenses in accordance with the present invention respectively, in which the spectacle frame and the auxiliary lenses are separated from each other.
Figure 3:
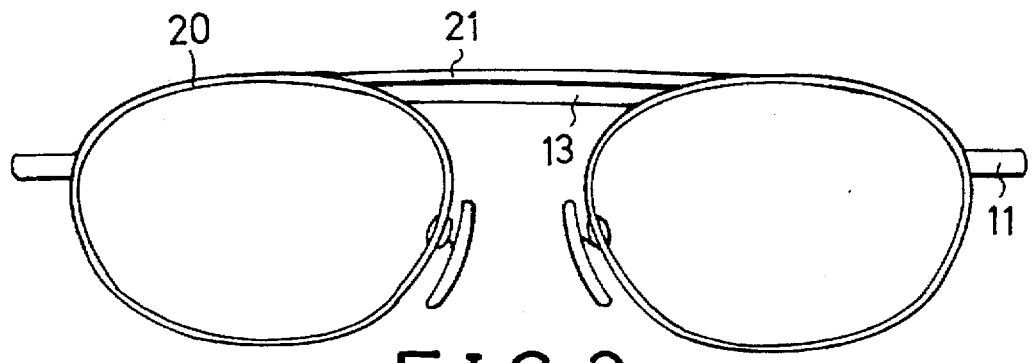
FIG. 3 is a front elevational view of the spectacle frame and the auxiliary lenses combination.
Figure 2:
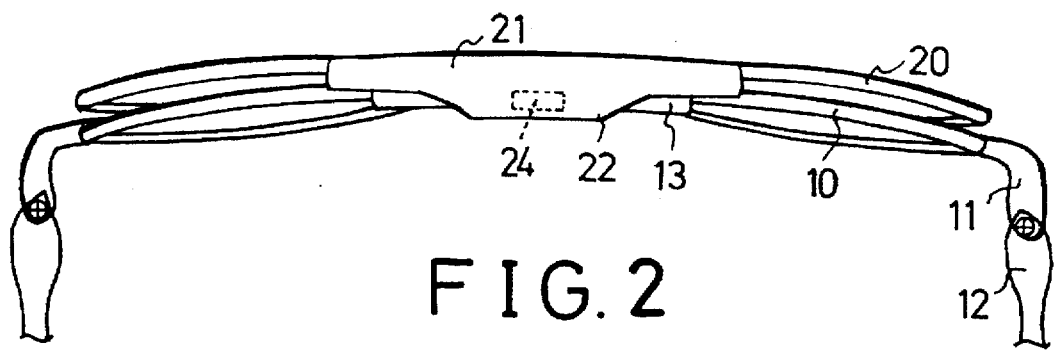
FIG. 2 is a top plan view of the spectacle frame and the auxiliary lenses combination.
Figure 4:
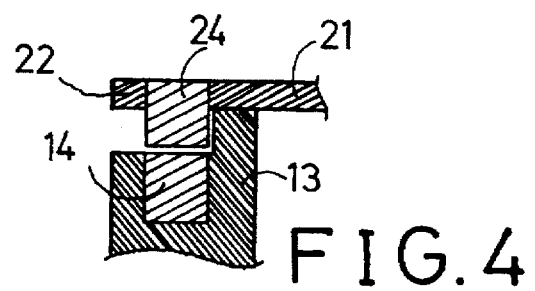
FIG. 4 is a cross sectional view taken along middle bridge portions of FIG. 2.

Referring to the drawings, and initially to FIGS. 1 to 3, an eyeglass device in accordance with the present invention comprises a primary spectacle frame 10 for supporting primary lenses therein. The primary spectacle frame 10 includes two side portions each having an extension 11 extended rearwardly therefrom for pivotally coupling a leg 12 thereto. The primary spectacle frame 10 includes a middle bridge portion 13 for supporting a magnetic or magnetizable connector member 14 therein. An auxiliary spectacle frame 20 is provided for supporting the auxiliary lenses therein and includes a middle bridge portion 21 having a projection 22 extended rearward therefrom for extending over and for engaging with the middle bridge portion 13 of the primary spectacle frame 10 (FIGS. 2–4). The auxiliary spectacle frame 20 also includes a magnetic or magnetizable connector member 24 secured in the projection 22 thereof for engaging with the connector member 14 of the primary spectacle frame 10 such that the auxiliary spectacle frame 20 can be stably supported on the primary spectacle frame 10, best shown in FIGS. 2–4.

It is to be noted that the projection 22 is engaged with and is supported on the middle bridge portion of the primary spectacle frame 10 such that the auxiliary spectacle frame 20 will not move downward relative to the primary spectacle frame and will not be easily disengaged from the primary spectacle frame when its user conducts jogging or jumping exercises.

It is further to be noted that the user is only required to engage the connector member 24 of the auxiliary spectacle frame 10 with the connector member 14 of the primary spectacle frame, such that the frames 10, 20 can be easily secured with each other. The user can thus easily use only one hand to stably attach the auxiliary spectacle frame to the primary spectacle frame. Alternatively, only one of the connector members 14, 24 is required to be a magnet. For example, if only connector member 24 is provided as a magnet in the middle bridge member 21 of the auxiliary spectacle frame, the connector member 14 is not required to be a magnet, but could be composed typically of magnetic iron. It is only required to have the middle bridge member 13 made by magnetically attractive material such that the middle bridge member 21 of the auxiliary spectacle frame 20 may also be easily attached to the primary spectacle frame 10. Only one or one pair of magnetizable members are required to be a magnet for attaching the spectacle frames together.

Referring next to FIG. 4, it is preferable that the connector member 24 is slightly extended downward toward the connector member 14 such that the auxiliary spectacle frame 20 may further be stably supported and secured to the primary spectacle frame 10.

Accordingly, the eyeglass device of the present invention includes an auxiliary spectacle frame that may be easily secured to the primary spectacle frame with only one hand. In addition, only one of the pair of magnetic members is required to be a magnet for attaching the spectacle frames together.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An eyeglass device comprising:
   a primary spectacle frame for supporting primary lenses therein, said primary spectacle frame including a middle bridge portion, a first magnetic member secured in said middle bridge portion of said primary spectacle frame, an auxiliary spectacle frame for supporting auxiliary lenses therein, said auxiliary spectacle frame including a middle bridge portion having a projection extended therefrom for extending over and for engaging with said middle bridge portion of said primary spectacle frame, and a second magnetic member secured to said projection of said auxiliary spectacle frame for engaging with said first magnetic member of said primary spectacle frame and for allowing said auxiliary spectacle frame to be attached to said primary spectacle frame with only one hand by a user.

2. An eyeglass device comprising:

a primary spectacle frame for supporting primary lenses therein, said primary spectacle frame including a middle bridge portion, a first connector member secured in said middle bridge portion of said primary spectacle frame, an auxiliary spectacle frame for supporting auxiliary lenses therein, said auxiliary spectacle frame including a middle bridge portion having a projection extended therefrom for extending over and for engaging with said middle bridge portion of said primary spectacle frame, a second connector member secured to said projection of said auxiliary spectacle frame for engaging with said first connector member of said primary spectacle frame, and magnetic means operatively associated with the first and second connector members whereby they are connectable to each other magnetically for allowing said auxiliary spectacle frame to be attached to said primary spectacle frame with only one hand by a user.

3. The eyeglass device as claimed in claim 2, with the first connector member being a magnet, the second connector member being a magnetizable substance.

4. The eyeglass device as claimed in claim 2, with the second connector member being a magnet, the first connector member being a magnetizable substance.

* * * * *

(12) EX PARTE REEXAMINATION CERTIFICATE (8117th)
United States Patent
Chao

(10) Number: US 5,737,054 C1
(45) Certificate Issued: Mar. 29, 2011

(54) AUXILIARY LENSES FOR EYEGLASSES

(75) Inventor: Richard Chao, Chia Yi Hsien (TW)

(73) Assignee: Contour Optik, Inc., Chiayi (TW)

Reexamination Request:
No. 90/009,532, Jul. 17, 2009

Reexamination Certificate for:
Patent No.: 5,737,054
Issued: Apr. 7, 1998
Appl. No.: 08/766,327
Filed: Dec. 13, 1996

(51) Int. Cl.
*G02C 9/00* (2006.01)
*G02C 7/08* (2006.01)

(52) U.S. Cl. ............................................. 351/47; 351/57
(58) Field of Classification Search ......................... None
See application file for complete search history.

(56) References Cited

U.S. PATENT DOCUMENTS

| | | | |
|---|---|---|---|
| 188,246 A | 3/1877 | Johnson |
| 1,613,765 A | 1/1927 | Nerney |
| 1,679,233 A | 7/1928 | Strauss |
| 1,907,749 A | 5/1933 | Dechau |
| 1,936,319 A | 11/1933 | Wingate |
| 2,065,122 A | 12/1936 | Diggins |
| 2,117,436 A | 5/1938 | Lindblom |
| 2,141,063 A | 12/1938 | Euler |
| 2,254,637 A | 9/1941 | Welsh |
| 2,492,072 A | 12/1949 | Tapner |
| 2,587,472 A | 2/1952 | Hoffmaster |
| D170,435 S | 9/1953 | Weissman |
| 2,737,847 A | 3/1956 | Tessauro |
| 2,770,168 A | 11/1956 | Tessauro |
| 3,161,932 A | 12/1964 | Russell |
| 3,498,701 A | 3/1970 | Miller |
| 3,531,188 A | 9/1970 | LeBlanc et al. |
| 3,531,190 A | 9/1970 | LeBlanc |
| 3,536,385 A | 10/1970 | Johnston |
| 3,565,517 A | 2/1971 | Gitlin et al. |
| 3,582,192 A | 6/1971 | Gitlin et al. |
| D221,480 S | 8/1971 | Tagnon |
| 3,838,914 A | 10/1974 | Fernandez |
| 4,021,892 A | 5/1977 | Piper |
| 4,070,103 A | 1/1978 | Meeker |
| 4,070,105 A | 1/1978 | Marzouk |
| 4,196,981 A | 4/1980 | Waldrop |
| 4,217,037 A | 8/1980 | Lemelson |
| 4,380,379 A | 4/1983 | Ahern |
| 4,432,616 A | 2/1984 | Kurosaka |
| 4,466,713 A | 8/1984 | Tanaka |
| 4,547,909 A | 10/1985 | Bell |
| 4,685,782 A | 8/1987 | Lhospice |
| D291,808 S | 9/1987 | Meyerspeer |
| 4,822,158 A | 4/1989 | Porsche |
| 4,878,749 A | 11/1989 | McGee |
| D307,756 S | 5/1990 | Porsche |
| 4,988,181 A | 1/1991 | Riach |
| 5,181,051 A | 1/1993 | Townsend et al. |
| 5,243,366 A | 9/1993 | Blevins |

(Continued)

FOREIGN PATENT DOCUMENTS

| | | | |
|---|---|---|---|
| CN | 107096 | * | 7/1985 |
| DE | 8806989.6 | * | 10/1988 |
| DE | 3905041 | | 8/1990 |

(Continued)

OTHER PUBLICATIONS

"Twincome–Pentax Documents" Describing Twincome in A Patent Opposition in Germany Initiated by Pentax on or about Apr. 30, 1997.

*Primary Examiner*—My-Trang Nu Ton

(57) ABSTRACT

An eyeglass device includes a primary and an auxiliary spectacle frames for supporting lenses. The primary spectacle frame includes a magnetic connector member secured in the middle bridge portion. The auxiliary spectacle frame includes a middle bridge portion having a projection for engaging over the middle bridge portion of the primary spectacle frame and having a magnetic connector member for engaging with the connector member of the primary spectacle frame such that the spectacle frames can be easily secured together with only one hand.

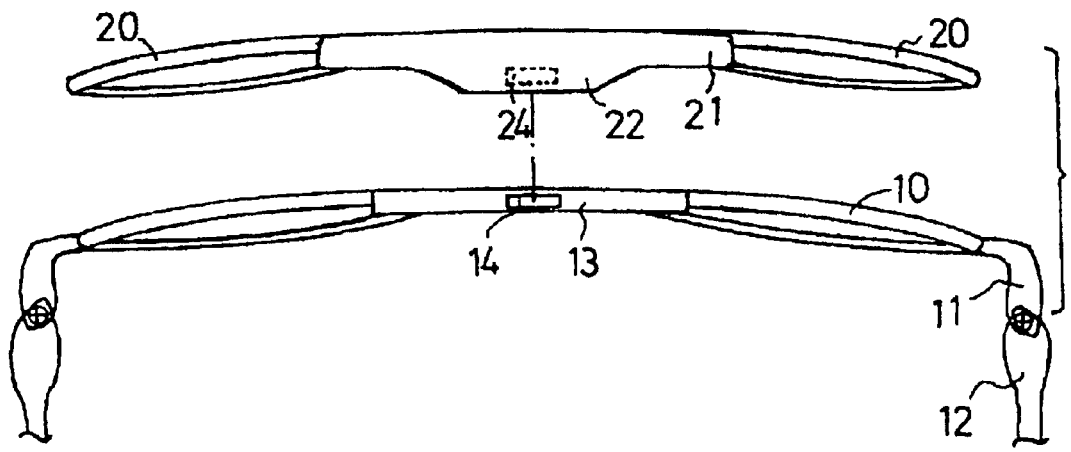

U.S. PATENT DOCUMENTS

| | | | |
|---|---|---|---|
| 5,321,442 | A | 6/1994 | Albanese |
| 5,345,669 | A | 9/1994 | Zigler et al. |
| 5,389,981 | A | 2/1995 | Riach |
| 5,410,763 | A | 5/1995 | Bolle |
| 5,416,317 | A * | 5/1995 | Nishimura et al. .......... 250/221 |
| 5,416,537 | A | 5/1995 | Sadler |
| 5,461,432 | A | 10/1995 | Huang |
| 5,478,612 | A | 12/1995 | Hack et al. |
| 5,568,207 | A * | 10/1996 | Chao ........................... 351/57 |
| 5,642,177 | A | 6/1997 | Nishioka |
| 5,682,222 | A | 10/1997 | Chao |
| 5,684,558 | A | 11/1997 | Hamamoto |
| 5,696,571 | A | 12/1997 | Spencer et al. |
| 5,710,614 | A | 1/1998 | Cereda |
| 5,724,118 | A | 3/1998 | Krebs |
| 5,877,838 | A | 3/1999 | Chao |
| 5,882,101 | A | 3/1999 | Chao |
| 5,883,688 | A | 3/1999 | Chao |
| 5,889,574 | A | 3/1999 | Gandl-Schiller |
| 5,912,718 | A | 6/1999 | Murai et al. |
| 5,914,768 | A | 6/1999 | Hyoi |
| 6,012,811 | A | 1/2000 | Chao et al. |
| 6,092,896 | A | 7/2000 | Chao et al. |
| 6,109,747 | A | 8/2000 | Chao |
| 6,149,269 | A | 11/2000 | Madison |
| 6,170,948 | B1 | 1/2001 | Chao |
| 7,040,751 | B2 | 5/2006 | Madison |

FOREIGN PATENT DOCUMENTS

| | | | |
|---|---|---|---|
| DE | 3919489 | | 12/1990 |
| DE | 3920879 | | 1/1991 |
| DE | 3921987 | | 1/1991 |
| DE | 3933310 | * | 1/1991 |
| DE | 4316698 | | 11/1994 |
| FR | 1266652 | | 6/1961 |
| FR | 2483632 | | 4/1981 |
| FR | 2657436 | | 7/1991 |
| GB | 846425 | | 8/1960 |
| GB | 855268 | | 11/1960 |
| JP | 4415392 | | 7/1969 |
| JP | 54111841 | | 9/1979 |
| JP | 54111842 | | 9/1979 |
| JP | 54163052 | | 12/1979 |
| JP | 5550217 | | 4/1980 |
| JP | 55083022 | | 6/1980 |
| JP | 55133014 | | 10/1980 |
| JP | 55135814 | | 10/1980 |
| JP | 5629209 | | 3/1981 |
| JP | 56095214 | | 8/1981 |
| JP | 56153317 | | 11/1981 |
| JP | 57178215 | | 11/1982 |
| JP | 57184910 | | 11/1982 |
| JP | 61-2621 | | 1/1986 |
| JP | 63-188626 | | 12/1988 |
| JP | 1-136114 | | 5/1989 |
| JP | 2-109325 | | 8/1990 |
| JP | 5-157997 | | 6/1993 |
| JP | 05-196899 | | 8/1993 |
| JP | 5-404493 | | 10/1993 |
| JP | 05-289029 | | 11/1993 |
| JP | 06-265828 | | 9/1994 |
| JP | 06-331943 | | 12/1994 |
| JP | 07-028001 | | 1/1995 |
| JP | 07-010722 | | 2/1995 |
| JP | 07-056123 | | 3/1995 |
| JP | 3011174 | | 5/1995 |
| JP | 7-128620 | | 5/1995 |
| JP | 07-244259 | | 9/1995 |
| JP | 08-050263 | | 2/1996 |
| JP | 3031881 | * | 12/1996 |
| JP | 9043544 | | 2/1997 |
| JP | 9061754 | | 3/1997 |
| JP | 07-156856 | | 4/1997 |
| JP | 9101489 | | 4/1997 |
| RU | 220885 | | 6/1968 |
| TW | 274588 | | 4/1996 |
| WO | 9009611 | | 8/1990 |
| WO | 9518986 | | 7/1995 |
| WO | 9523995 | | 9/1995 |
| WO | 9623241 | | 8/1996 |

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-4 is confirmed.

* * * * *